United States Patent
Byington, Jr.

[11] 3,977,238
[45] Aug. 31, 1976

[54] MOTOR VEHICLE ECONOMY MEASURING INSTRUMENT
[76] Inventor: Melville R. Byington, Jr., 8620 Camden St., Alexandria, Va. 22308
[22] Filed: June 16, 1975
[21] Appl. No.: 587,080

[52] U.S. Cl. ................................ 73/114; 73/115
[51] Int. Cl.² ..................................... G01M 15/00
[58] Field of Search .......................... 73/114, 115

[56] References Cited
UNITED STATES PATENTS

| | | | |
|---|---|---|---|
| 3,084,539 | 4/1963 | Wentworth | 73/114 |
| 3,263,503 | 8/1966 | White | 73/115 |
| 3,608,368 | 9/1971 | Cuff | 73/115 |

Primary Examiner—Richard C. Queisser
Assistant Examiner—Anthony V. Ciarlante

[57] ABSTRACT

A device is disclosed for providing an operator of a motor vehicle with a continuous indication of gas mileage and engine efficiency and operating conditions as well as an indication of the effect the operator's driving habits have upon fuel economy. A vacuum gauge device is provided the input of which is coupled to a source of vacuum from the intake manifold of the vehicle's internal combustion engine. Two numeric scales are provided imprinted upon the scale plate of the gauge. A first scale calibrated in miles per gallon (or kilometers per liter) indicates the rate of fuel consumption independent of road conditions or vehicle load. The second numeric scale is calibrated in miles per hour corresponding to efficient engine operation. A reading on that scale higher than the steady speed at which the vehicle is then traveling indicates less than peak operating efficiency. A marker may also be provided upon the gauge scale which indicates the proper intake manifold pressure for efficient operation during engine idling conditions. Means may also be provided adjusting out changes in readings caused by changes in atmospheric pressure.

18 Claims, 3 Drawing Figures

MOTOR VEHICLE ECONOMY MEASURING INSTRUMENT

BACKGROUND OF THE INVENTION

1. Field of the Invention

The invention pertains to a device for an automobile or any other type of motor vehicle powered by an internal combustion engine for continuously providing a measure of the economy of operation of the vehicle. More particularly, the invention relates to a device which provides the operator of a motor vehicle with a continuous indication of the rate of fuel consumption readable directly in miles per gallon, kilometers per liter or any other desired measure of the rate of fuel consumption. The device may also provide other tests or checks of operating economy.

2. Description of the Prior Art

It was recognized early in the history of the development of internal combustion engines that the vacuum, or more precisely the relative pressure below atmospheric pressure, in the intake manifold of an internal combustion engine is related to the rate of fuel consumption and hence to the operating economy of the vehicle powered by the engine. Numerous devices have been developed during the preceding decades which in some way have taken advantage of this fact. The great majority of these devices gave a simple "yes" or "no" type indication of whether or not the vehicle was then being operated in an economical manner. For example, a lamp would be lit or a meter dial would deflect past a marker point when the vacuum in the intake manifold fell below a predetermined level. Unfortunately, these devices provided only an extremely rough indication of operating conditions to the operator of the vehicle employing the instrument. The indication given was subjective, being dependent upon an arbitrary pressure as a cross-over point between economical and uneconomical operating conditions. The operator was given no numeric or accurate indication of precisely the current rate of fuel consumption. Nor could the operator determine from such devices whether an indication of uneconomical operation was indicative of poor driving habits or of a mechanical problem with the engine.

At a comparatively late date devices were developed which directly measured fuel consumption by measuring the rate of flow in the fuel line between the fuel tank and carburetor. Flow rate measuring devices have been found to be inherently more expensive than pressure measuring devices. Often, electronic circuitry is required to translate the output of a fuel flow measuring device into a usable indication. Of course, the price of the total apparatus in that case is unduly expensive and often prohibitive.

Furthermore, none of the devices of the prior art were capable of providing an operator of a motor vehicle with an indication of whether or not the vehicle was then operating and being operated to achieve the maximum possible fuel economy, that indication being made for the normal range of operating speeds of the vehicle. Nor did the devices of the prior art indicate at engine idle speed and conditions whether the engine was in proper tune and operating at maximum efficiency and economy.

SUMMARY OF THE INVENTION

Accordingly, it is an object of the present invention to provide an inexpensive instrument or device for providing an operator of a motor vehicle with a continuous numeric indication of the rate of fuel consumption of the motor vehicle wherein the operator can read the rate of fuel consumption directly from a gauge instrument.

It is also an object of the invention to provide such a device for providing an indication of whether the vehicle is being operated at the maximum possible fuel economy for the speed at which the vehicle is then traveling.

Moreover, it is another object of the invention to provide a device which indicates at engine idle speed and conditions whether the engine is then in proper tune and operating at maximum efficiency and economy.

Furthermore, it is an object of the invention to provide a device in accordance with one or more of the aforementioned objects of the invention which includes means for calibrating the device to give accurate readings independent of atmospheric pressure and elevation.

These, as well as other objects of the invention, may be met by providing the combination of means for measuring the relative pressure in the intake manifold of an internal combustion engine having indicating means responsive to the pressure in the intake manifold, a first numeric scale calibrated for providing an indication of the amount of fuel consumed by the engine per unit of distance travelled by the vehicle, a second numeric scale calibrated in units of speed corresponding to intake manifold pressures for a properly operating engine, an idling indicating marker, that marker corresponding to an intake manifold pressure for a properly operating engine at idle speed of the engine, and wherein the visual indicating means provides simultaneously an indication for the idle indicating marker and upon the first and second numeric scale. In preferred embodiments of the invention the pressure measuring means comprises a vacuum pressure gauge operatively coupled to the intake manifold of the engine. The vacuum gauge preferably comprises a circular gauge plate and rotatable pointing means which operates in response to the pressure in the intake manifold of the vehicle's engine. Upon the gauge plate are imprinted the first and second numeric scales and the idle indicating marker. Means may further be provided for correcting indications upon the first and second numeric scales and idle indicating marker for changes in local atmospheric pressure. This correcting means may comprise means for rotating either the circular gauge plate or the pointing means. For the former case, the gauge plate will comprise a plurality of gear teeth along at least a portion of the outer edge of the plate. A shaft with gear teeth engaging those of the circular plate is also provided with a knob coupled to the shaft. The knob is rotated to rotate the circular gauge plate to align the pointing means with a calibration mark when substantially atmospheric pressure is applied to the gauge, that is, when the engine is not running. Correcting means may also comprise means for automatically compensating the gauge for changes in atmospheric pressure and may include a compensating bellows operatively coupled to the main pressure measuring bellows.

Means is also included for operatively coupling the gauge to the intake manifold of the engine. In a preferred embodiment, the first numeric scale is substantially hyperbolic with respect to the pressure in the intake manifold. The first numeric scale is preferably calibrated in miles per gallon and the second numeric scale is calibrated in miles per hour. Both first and second numeric scales are calibrated in accordance with predetermined particular characteristics of the vehicle in which the invention is installed.

The invention may also be practiced by a device for providing an operator of a motor vehicle with a continuous indication of the performance and operating efficiency of the vehicle and for providing the operator with an indication of and means for monitoring the operating efficiency of the motor vehicle as affected by the method of operating the motor vehicle used by the operator, the device comprising a vacuum gauge having a pointer, a circular gauge plate and a pointer which is rotatable in the plane of the circular gauge plate wherein the position of the pointer is determined by the pressure applied to the vacuum gauge, a tube for coupling the vacuum gauge to an intake manifold of the engine of the vehicle, a first scale imprinted upon the circular gauge calibrated in miles driven per gallon of fuel consumed by the vehicle, a second numeric scale imprinted upon the circular gauge calibrated in miles per hour corresponding to efficient operation of the vehicle for a level road and for normal load conditions, and an idle indicating marker imprinted upon the circular gauge at a position coresponding to efficient operation of the engine at idling conditions. The first of the numeric scales is preferably calibated for the cruising gear of the vehicle. One or more additional scales may also be provided calibrated either in miles per gallon or miles per hour wherein each of the additional scales is calibrated for operation with the gears of the vehicle other than cruising gear. Means may further be provided for correcting the position of the pointer upon the various scales for changes in atmospheric pressure. The correcting means may rotate either the pointer or circular gauge.

DESCRIPTION OF THE PREFERRED EMBODIMENTS

Figure 1:
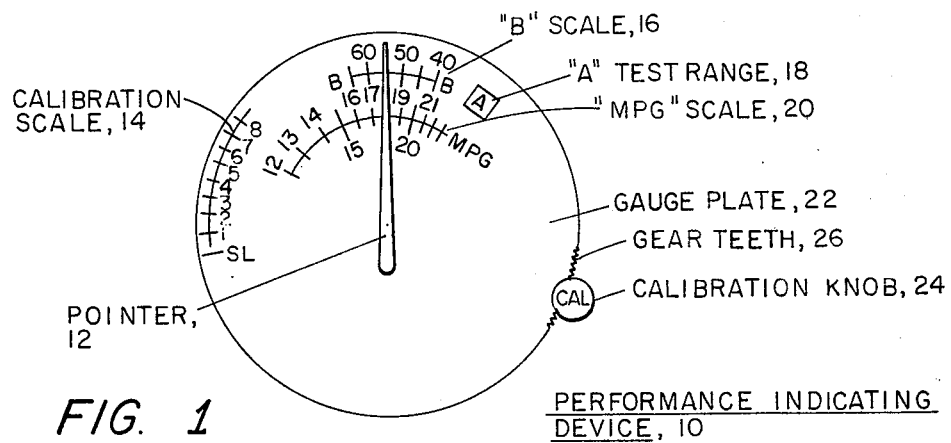
FIG. 1 is a planar view of the face of an automobile performance measuring and indicating device in accordance with the invention.

Referring first to FIG. 1 there is shown there a planar view of the face of a performance indicating device or instrument shown generally at 10 constructed in accordance with the teachings of the present invention. The instrument is constructed using a vacuum pressure gauge as the basic indicating and measuring device.

A performance indicating device 10 in accordance with the invention includes a circular gauge plate 22 having two or more numeric scales imprinted thereon, the scales differing markedly from the scales ordinarily employed with an ordinary pressure gauge. The invention contemplates the use of at least two scales, a MPG scale and a "B" scale.

The MPG scale is calibrated to provide an instantaneous indication of the rate of fuel consumption of the vehicle. Most commonly, the MPG scale will be calibrated in miles per gallon for operation of the vehicle in its highest forward gear, that is, the "cruising" gear. In other embodiments, the MPG scale may be calibrated for operation with other gears, or a plurality of such scales may be provided, one for each gear or only selected gears. Other units of measure may be used as well such as kilometers per hour.

Figure 2:
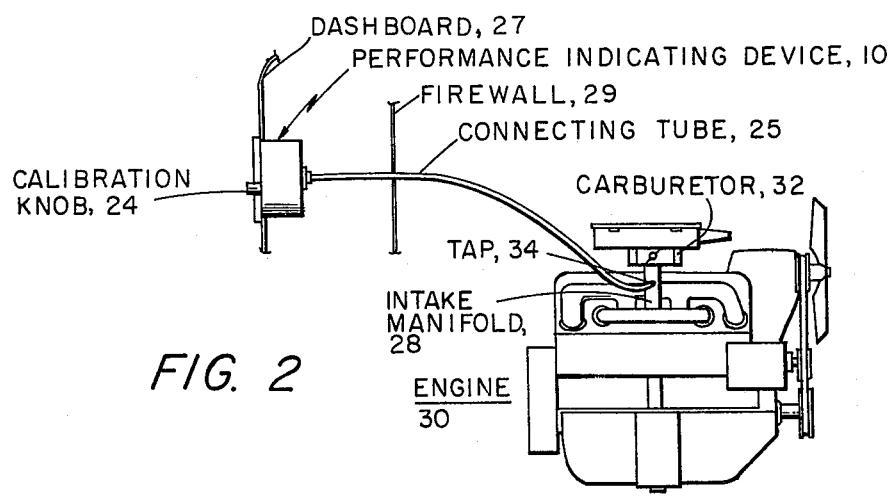
FIG. 2 shows in perspective form the device of FIG. 1 coupled to an intake manifold of an internal combustion engine in accordance with the invention.

The instrument 10 of FIG. 1 is coupled to the intake manifold 28 of engine 30 as shown in FIG. 2. Pointer 12 is rotated about the center of circular gauge plate 22 in response to the pressure within intake manifold 28. Preferably, pointer 12 rotates clockwise for decreases in intake manifold pressure and counterclockwise for increases in that pressure. As the pressure within intake manifold 28 is always below atmospheric pressure so long as engine 30 is running, the numeric scales are preferably arranged such that pointer 12 rests at the left of the scales when engine 30 is turned off and atmospheric pressure is present in intake manifold 28.

That the rate of fuel consumption is related to the pressure within intake manifold 28 is developed as follows: It is known that the air-fuel mass ($M_{AF}$) inducted per stroke of a piston drive internal combustion engine is directly proportional to the product of the swept-out cylinder volume (v) and the absolute pressure in the intake manifold (p) and inversely proportional to the absolute temperature (T) of the air-fuel mixture. Symbolically, the relationship is:

$$M_{AF} = C_1 \frac{vp}{T},$$

where $C_1$ is a constant of proportionality. The swept-out cylinder volume v is of course a constant for a unit distance travelled and a fixed gear ratio. Its value depends upon the dimensions of the particular engine and the vehicle's gear ratio. As all modern automotive engines include means for maintaining the air-fuel mixture at a substantially constant temperature, it is assumed that T is also a constant. Thus, the above equation may be reduced to:

$$M_{AF} = C_2 p,$$

where $C_2$ is a second constant. It is seen that the air-fuel mass inducted per stroke is proportional only to the absolute value of intake manifold pressure. It should be noted at this point that p is absolute pressure, i.e., that magnitude of measured pressure over a vacuum and not gauge pressure which is a measure of pressure above atmospheric pressure.

The air-fuel mass $M_{AF}$ includes both the mass of inducted air and mass of inducted fuel. However, for most normal driving, the ratio of $M_F$, the mass of inducted fuel, to $M_A$, the mass of inducted air is substantially constant. Hence, $M_F$ is proportional to the mass of the fuel alone. Thus, the above equation may be written:

$$M_F = C_3 p.$$

It is more convenient to measure gauge pressure than absolute pressure. If P is the ambient atmospheric pressure and V is the vacuum gauge reading, then:

$$p = P - V,$$

and hence:

$$M_F = C_3(P - V).$$

Since $M_F$ is inversely proportional to the rate of fuel consumption (M), the above equation may be written:

$$M = \frac{k}{P-V}, \quad \text{or}$$

$$k = M(P-V),$$

where $k$ is a constant. Once a single value of $k$ has been determined, the pressure gauge may be calibrated directly in terms of miles per gallon, kilometers per liter, or any other desired measure of the rate of fuel consumption.

To calibrate the gauge, a mileage rate M for a single vacuum setting is first determined. This may be done in any of a number of ways such as with the use of a dynamometer or directly with the use of a calibrated fuel container. In the latter case, fuel is coupled into the fuel line from a container with calibrated volumetric markings. A constant gauge pressure reading is attained and the amount of fuel consumed in a predetermined distance is measured. M is equal to the amount of fuel consumed divided by the distance travelled. The characteristic constant k is then computed using the computed M and the then present value of P, the atmospheric pressure. The entire MPG scale may then be calibrated using the equation:

$$V = P - \frac{k}{M}$$

to determine the V corresponding to integer values of M.

Figure 3:
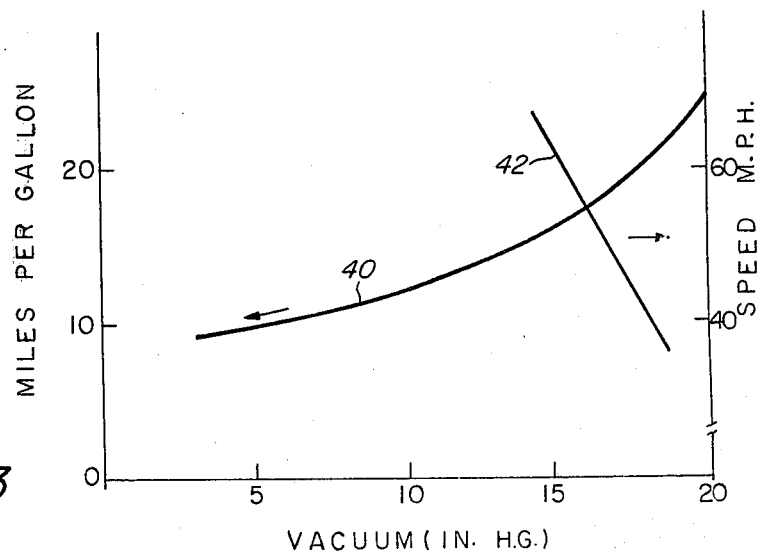
FIG. 3 is a graph of two exemplary calibration curves used with the invention.

An example of a calibration curve for a particular vehicle is shown as curve 40 of FIG. 3. A value of $k = 248.4$ was found for the vehicle used and curve 40 prepared using that value. Curve 40 is hyperbolic in form as is evident from the penultimate equation above.

The "B" scale shown in FIG. 1 is calibrated by taking pressure readings for a properly tuned engine operating upon a level road with the load which the vehicle would normally by expected to carry. A pressure reading is obtained at a number of different speeds. The scale is then inscribed or imprinted upon the surface of the gauge plate in accordance with the readings taken. It has been found that speed is essentially a linear function of intake manifold vacuum for a properly tuned and operating engine. An example of a calibration curve for the same vehicle as for curve 40 is shown as curve 42 of FIG. 3.

The "A" test range scale 18 shown in FIG. 1 indicates the proper range of intake manifold pressure for a properly timed and operating engine at engine idle speed and conditions. This range may be calibrated by ensuring that the engine to which the device is coupled is indeed operating properly at idle and marking the normal limits of pressure upon gauge plate 24. The operator of the vehicle can quickly determine from test range A 18 whether the engine is properly operatng and in many instances the device can forewarn an operator of imminent problems. For example, typically a failed or improperly firing spark plug will cause pointer 12 to jump erratically in and out of the limits of test range A 18. Without the device the failure of a single spark plug would not ordinarily be so clearly perceptible. Other abnormal conditions may be detected as well such as improperly adjusted or failed intake valves. A faulty intake valve will cause an indication at idle speed outside test range A 18 due to an increase in intake manifold pressure.

Most vacuum gauges are of the sealed bellows type in which pressure or vacuum introduced into the interior of the bellows causes expansion or contraction, respectively, of the bellows. Movement of the bellows is mechanically coupled to the pointing means. Unfortunately, the pressure indicated by the pointing means is affected by the external ambient atmospheric pressure as that pressure acts upon the exterior of the bellows in opposition to the pressure or vacuum to be measured inside the bellows. Erroneous indications can result if changes in ambient atmospheric pressure are not accounted for in some manner. Automatic compensation can be applied by coupling a second sealed bellows to the measuring bellows wherein movement of the second bellows caused by changes in atmospheric pressure oppose similarly caused movement in the measuring bellows.

Secondly, and more simply, means may be provided for altering the position of either pointer 12 or circular gauge plate 22 to compensate for changes in ambient atmospheric pressure. Preferably, as shown in FIG. 1, means is provided for rotating circular gauge plate 22. A number of gear-type teeth are cut into at least a portion of the edge of circular gauge plate 22. These teeth mate with teeth upon a shaft to which calibration knob 24 is coupled. Circular gauge plate 22 is free to rotate around its center. Rotation of calibration knob 24 thus produces rotation of circular gauge plate 22 with respect to pointer 12.

To accommodate operating elevations significantly above sea level (i.e., local atmospheric pressure significantly below the standard 29.92 inches Hg), the engine is turned off to establish atmospheric pressure in the intake manifold 28. Calibration knob 24 is rotated until the appropriate elevation marker, in thousands of feet above sea level, rests under the pointer. Calibration is complete and should require no further attention unless operating elevation changes by several hundred feet.

Performance indicating device 10 is preferably mounted upon dashboard 27 of the vehicle in full view of the operator. Also, performance indicating device 10 can be included as an addition to the normal instrument cluster of the vehicle. Connecting tube 25 may be operatively coupled to intake manifold 28 in any convenient manner.

This concludes the description of the preferred embodiments of the invention. Although preferred embodiments have been described, numerous modifications and alterations thereto would be apparent to one skilled in the art without departing from the spirit and scope of the invention.

What is claimed is:

1. A device for permitting the operator of a motor vehicle powered by an internal combustion engine to continuously monitor the fuel economy and operating efficiency of said vehicle comprising in combination:
    a gauge plate;
    means for measuring the relative pressure in the intake manifold of said engine, said measuring means comprising visual indicating means responsive to said pressure;
    a first numeric scale upon said gauge plate, said first numeric scale being calibrated to provide an indication of the amount of fuel consumed by said engine per unit of distance travelled by said vehicle;
a second numeric scale upon said gauge plate, said scale being calibrated in units of speed corresponding to intake manifold pressures for a properly operating engine, said second numeric scale being laterally adjacent at least a portion of said first numeric scale;
an idle indicating marker upon said gauge plate, said marker corresponding to an intake manifold pressure for a properly operating engine at idle speed of said engine; and
said visual indicating means providing simultaneously during operation of said vehicle an indication upon said first numeric scale corresponding to the rate of fuel consumption and upon said second numeric scale indicating to said operator the speed corresponding to proper operating economy of said vehicle for a level road and normal load conditions during movement of said vehicle and said visual indicating means providing an indication upon said idle indicating marker during idle conditions of said vehicle if said engine is operating properly or outside of said idle indicating marker if said engine is operating improperly during said idle conditions.

2. The combination of claim 1 wherein said pressure measuring means comprises a vacuum pressure gauge, said vacuum pressure gauge being operatively coupled to said intake manifold of said internal combustion engine.

3. The combination of claim 2 wherein said vacuum pressure gauge comprises:
a circular gauge plate; and
rotatable pointing means, said pointing means operating in response to said pressure in said intake manifold of said engine.

4. The combination of claim 3 further comprising:
means for correcting indications upon said first numeric scale, said second numeric scale, and said idle indicating marker for changes in atmospheric pressure.

5. The combination of claim 4 wherein said correcting means comprises:
means for rotating said circular gauge plate; and
a third numeric scale upon said gauge plate, said third numeric scale being calibrated corresponding to elevation above sea level, said pointing means providing an indication upon said third numeric scale when said engine is turned off.

6. The combination of claim 5 wherein said rotating means comprises:
a plurality of gear teeth upon at least a portion of the outer edge of said circular gauge plate;
a shaft having gear teeth, said gear teeth of said shaft operatively engaging said gear teeth of said circular gauge plate; and
a knob coupled to said shaft for rotating said shaft and said circular gauge plate to align said pointing means upon a calibration mark when substantially atmospheric pressure is applied to said gauge.

7. The combination of claim 4 wherein said correcting means comprises:
means for automatically compensating said gauge for changes in atmospheric pressure.

8. The combination of claim 4 further comprising:
means for operatively coupling said gauge to said intake manifold of said internal combustion engine.

9. The combination of claim 8 wherein said first numeric scale is substantially hyperbolic with respect to the pressure in the intake manifold.

10. The combination of claim 9 wherein said second numeric scale is substantially linear with respect to the pressure in the intake manifold.

11. The combination of claim 9 wherein said first numeric scale is calibrated in miles per gallon and said second numeric scale is calibrated in miles per hour.

12. The combination of claim 11 wherein said first and second numeric scales are calibrated in accordance with particular characteristics of the motor vehicle in which said device is installed.

13. A device for providing an operator of a motor vehicle with a continuous indication of the performance and operating efficiency of said motor vehicle and for providing said operator with an indication of and means for monitoring the operating efficiency of said motor vehicle as affected by the method of operating said vehicle used by said operator comprising in combination:
a vacuum gauge, said vacuum gauge having a pointer and a circular gauge plate, said pointer being rotatable in the plane of said circular gauge plate, the position of said pointer being determined be a pressure applied to said vacuum gauge;
a tube for coupling said vacuum gauge to an intake manifold of the engine of said vehicle;
a first numeric scale imprinted upon said circular gauge, said first numeric scale being calibrated in miles driven per gallon of fuel consumed by said vehicle;
a second numeric scale imprinted upon said circular gauge, said second scale being calibrated in miles per hour corresponding to efficient operation of said vehicle for a level road and for normal load conditions, said second numeric scale being laterally adjacent at least a portion of said first numeric scale;
an idle indicating marker, said idle indicating marker being imprinted upon said said circular gauge at a position corresponding to efficient operation of said engine at idling conditions; and
said pointer providing during forward movement of said vehicle simultaneous indications upon both said first numeric scale corresponding to the instantaneous rate of fuel consumption of said vehicle and upon said second numeric scale corresponding to the speed at which said vehicle should then be travelling for proper operating economy for a level road and normal load conditions and said pointer providing during idle conditions of said engine an indication upon said idle indicating marker when said engine is operating properly and outside of said idle indicating marker when said engine is operating inefficiently.

14. The combination of claim 13 wherein said first scale is calibrated for cruising gear of said vehicle.

15. The combination of claim 14 further comprising:
one or more additional scales imprinted upon said circular gauge, each of said additional scales being calibrated in miles per gallon or miles per hour and each of said additional scales being calibrated for operation with gears of said vehicle lower than said cruising gear.

16. The combination of claim 14 further comprising:
means for correcting the position of said pointer upon said scales for changes in atmospheric pressure.

17. The combination of claim 16 wherein said correcting means operates to rotate said pointer.

18. The combination of claim 16 wherein said correcting means operates to rotate said circular gauge.

* * * * *